W. J. BRAWNER.
COTTON THINNING MACHINE.
APPLICATION FILED FEB. 24, 1912.
1,032,656.
Patented July 16, 1912.
2 SHEETS—SHEET 1.
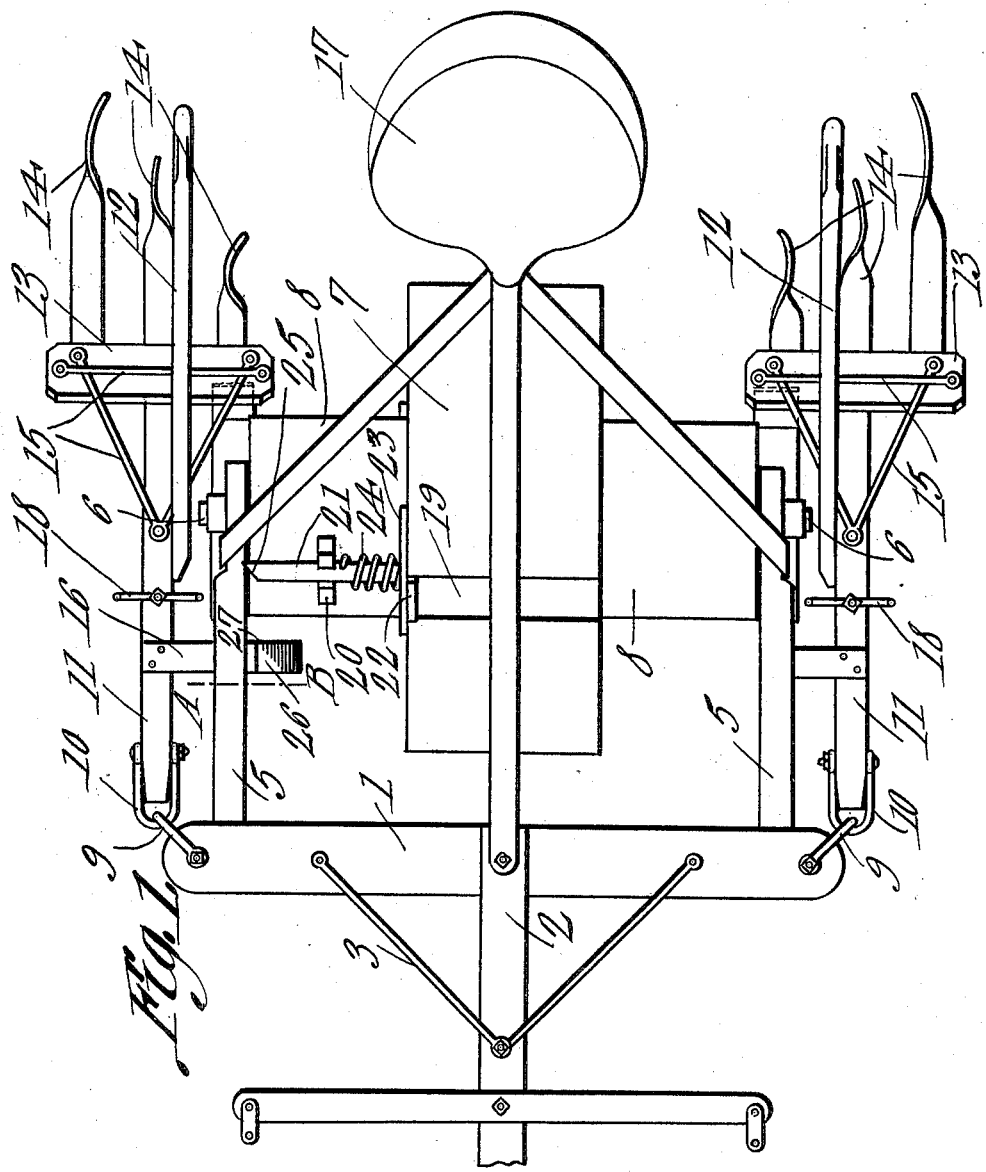
Witnesses
W. J. Brawner,
Inventor
by C. A. Snow & Co.,
Attorneys

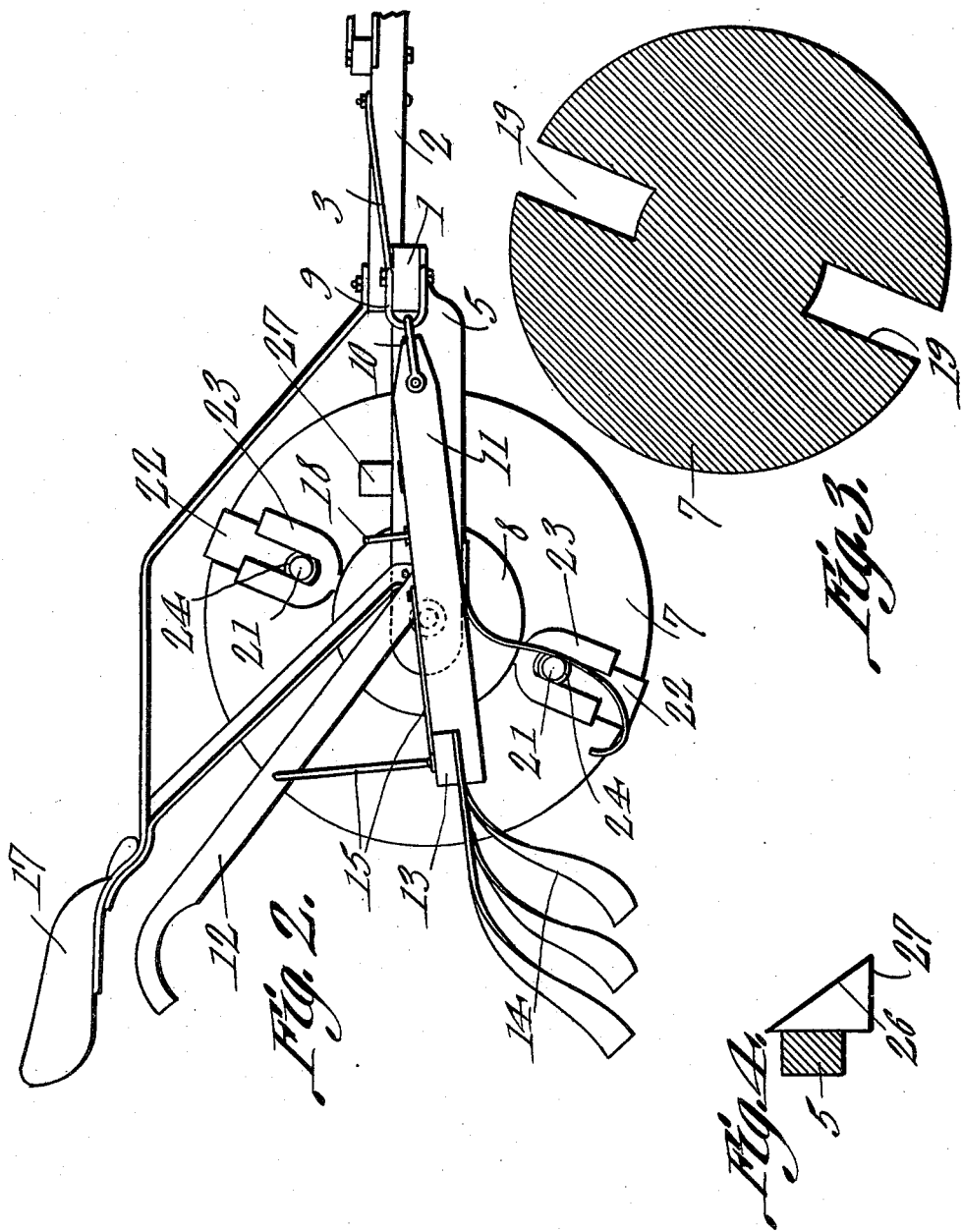

UNITED STATES PATENT OFFICE.

WILLIAM JEFFERSON BRAWNER, OF GRAND SALINE, TEXAS.

COTTON-THINNING MACHINE.

1,032,656.  Specification of Letters Patent.  Patented July 16, 1912.

Application filed February 24, 1912. Serial No. 679,714.

*To all whom it may concern:*

Be it known that I, WILLIAM J. BRAWNER, a citizen of the United States, residing at Grand Saline, in the county of Van Zandt and State of Texas, have invented a new and useful Cotton-Thinning Machine, of which the following is a specification.

This invention relates to machines for thinning rows of cotton plants, the machine being particularly one of that type wherein certain of the plants are crushed while other plants are left standing, means being provided for throwing dirt over the crushed plants.

One of the objects of the invention is to provide improved means for crushing the plants, said means having plant receiving recesses whereby certain of the plants in the path of the crushing means are left standing.

A further object is to provide means whereby the recesses in the crushing element are automatically cleaned.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of the machine. Fig. 2 is a side elevation thereof. Fig. 3 is a vertical longitudinal section through the crushing element. Fig. 4 is a section on line A—B Fig. 1 and showing the ejector actuating cam.

Referring to the figures by characters of reference 1 designates a cross beam having a draft tongue 2 secured to the center thereof and extending forwardly therefrom, said tongue being braced by means of rods 3 or the like secured to it and to the cross beam 1. Side beams 5 extend rearwardly from the end portions of the cross beam 1 and are supported, at their rear ends, by an axle 6 extending transversely of the machine and through the center of a crushing roll 7, said roll being spaced from the side beams 5 by sleeves 8 which are mounted on the axle 6.

Loops 9 extend from the end portions of the cross beam 1 and are engaged by clevises 10 connected to the front ends of cultivator beams 11, these beams being extended rearwardly and each being provided, at its rear end, with an upwardly extending handle 12. A cross member 13 is mounted on each beam 11 and has cultivator blades 14 secured to it and so shaped as to direct soil inwardly toward the crushing roll 7. Braces 15 may be provided for connecting the cross member 13 to the handle 12 and also for connecting said cross member to the beam 11. A supporting plate 16 extends inwardly from each beam 11 near the front end thereof and is adapted, when said beam is raised and swung toward the roller 7, to bear downwardly on the adjacent side beams 5 and thus support the cultivator blades 14 out of contact with the soil. A seat 17 is preferably mounted above the space between the side beams 5 and yokes 18 are preferably arranged on the beam 1 where they can be reached and actuated by the driver occupying the seat 17. Thus it will be seen that the driver can shift the beams 11 toward or from each other by placing the feet in the yokes 18 or, if the seat 17 is not used, said beams can be shifted by the operator walking back of and holding the handles 12.

Formed within the roller 7 preferably at diametrically opposed points are slots or recesses 19 of sufficient depth to receive certain of the plants in the row being operated on. Extending from one of the sleeves 8 at one side of each recess 19 is a bracket 20 in which a stem 21 is slidably mounted, this stem being provided, at one end, with a cleaning head 22 adapted to fit within the recess 19 and to shift longitudinally thereof. Stem 21 may be slidably mounted in a guide plate 23 secured to one side of the roller 7 and across one end of the recess 19. A spring 24 is mounted on the stem and is connected at one end thereto and bears at its other end upon the plate 23. This spring serves to hold the head 22 normally seated at one end of the recess 19 and against the plate 23. When the head is thus located, the outer or free end of the stem 21, which is preferably beveled as shown at 25, is arranged so as to move against the beveled face 26 of a tripping cam 27 secured to the inner face of one of the side beams 5.

It will be apparent that, when the roller 7 is drawn along the row of plants, certain of the plants will be crushed by the peripheral portion of the roller whereas the remaining plants will enter the recesses 19 and be unaffected by the roller. These plants will thus be left standing after the roller has passed them and, before the recesses come again to positions to receive additional plants, the stems 21 will move against the cams 26 and be shifted longitudinally thereby and against the stress of the springs 24. Any dirt or other accumulations within the recesses 19 will thus be ejected by the heads 22 and after the cam 26 has been passed, the springs 24 will return the heads and stems to their initial positions.

It will be understood that while the machine is in operation, dirt will be shifted toward the row by the cultivator blades 14 and the crushed plants will thus be covered.

What is claimed is:—

1. A machine of the class described including a plant crushing roller having a plant receiving recess in the periphery thereof, an ejecting element normally located at one side of the recess and revoluble with the roller, and means in the path of said element for automatically shifting the element into the recess during the rotation of the roller.

2. A machine of the class described including a plant crushing roller having a plant receiving recess in the periphery thereof, an ejecting head mounted for movement longitudinally of the recess and transversely of the roller, yielding means for holding said head normally in one side of the recess, a stem projecting from the head, and means in the path of and adapted to be contacted by the stem, for shifting the stem and head longitudinally of the recess during the rotation of the roller.

3. A machine of the class described including a plant crushing roller having a plant receiving recess in the periphery thereof, an ejecting head revoluble with the roller and normally seated at one end of the recess, a stem projecting from the head, yielding means for holding the head normally in a predetermined position, and a fixed cam for automatically shifting the head within the recess from one side of the roller toward the other side during the rotation of the roller.

4. The combination with a structure including connected side beams, an axle carried by said beams, and a combined supporting element and crushing roller revoluble on the axle and having a plant receiving recess in its periphery, of an ejecting element revoluble with the roller, yielding means for holding the same normally in a predetermined position relative to the roller, a stem projecting from said element, and means fixedly mounted on one of the side beams in the path of said stem for shifting the stem within the recess from one side of the roller toward the other side during the rotation of the roller.

In testimony that I claim the foregoing as my own, I have hereto affixed my signature in the presence of two witnesses.

WILLIAM JEFFERSON BRAWNER.

Witnesses:
U. SMEER,
S. B. MAUPIN.

---

Copies of this patent may be obtained for five cents each, by addressing the "Commissioner of Patents Washington, D. C."